US008145555B2

(12) United States Patent
Ausubel et al.

(10) Patent No.: US 8,145,555 B2
(45) Date of Patent: Mar. 27, 2012

(54) SYSTEM AND METHOD FOR THE EFFICIENT CLEARING OF SPECTRUM ENCUMBRANCES

(76) Inventors: Lawrence M. Ausubel, Washington, DC (US); Peter C. Cramton, Bethesda, MD (US); Paul R. Milgrom, Cambridge, MA (US)

( * ) Notice: Subject to any disclaimer, the term of this patent is extended or adjusted under 35 U.S.C. 154(b) by 1434 days.

(21) Appl. No.: 09/740,930

(22) Filed: Dec. 21, 2000

(65) Prior Publication Data
US 2002/0046037 A1    Apr. 18, 2002

(51) Int. Cl.
G06Q 40/00    (2006.01)
(52) U.S. Cl. .......................................... 705/37; 705/38
(58) Field of Classification Search ........... 705/1, 10–44
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,789,928 A * | 12/1988 | Fujisaki | 705/37 |
| 5,077,665 A | 12/1991 | Silverman et al. | |
| 5,136,501 A | 8/1992 | Silverman et al. | |
| 5,235,680 A | 8/1993 | Bijnagte | |
| 5,283,731 A | 2/1994 | Lalonde et al. | |
| 5,394,324 A | 2/1995 | Clearwater | |
| 5,664,115 A | 9/1997 | Fraser | |
| 5,689,652 A | 11/1997 | Lupien et al. | |
| 5,727,165 A | 3/1998 | Ordish et al. | |
| 5,791,991 A * | 8/1998 | Small | 463/41 |
| 5,835,896 A * | 11/1998 | Fisher et al. | 705/37 |
| 5,905,975 A | 5/1999 | Ausubel | |
| 5,924,083 A | 7/1999 | Silverman | |
| 5,974,399 A * | 10/1999 | Giuliani et al. | 705/14 |
| 6,012,045 A | 1/2000 | Barzilai | |
| 6,023,685 A | 2/2000 | Brett | |
| 6,023,686 A | 2/2000 | Brown | |
| 6,026,370 A * | 2/2000 | Jermyn | 705/14 |
| 6,047,264 A | 4/2000 | Fisher et al. | |
| 6,243,691 B1 | 6/2001 | Fisher et al. | |
| 6,272,473 B1 | 8/2001 | Sandholm | |
| 6,415,262 B1 * | 7/2002 | Walker et al. | 705/14 |
| 6,415,270 B1 * | 7/2002 | Rackson et al. | 705/36 R |

(Continued)

FOREIGN PATENT DOCUMENTS
WO    WO 96/34356    10/1996
(Continued)

OTHER PUBLICATIONS

Brian Fritts, "Private property, economic efficiency and spectrum policy in the wake of the C block auction", Federal Communications Law Journal, Los Angeles: May 1999, vol. 51, Iss. 3, ISSN/ISBN: 01637606.*

(Continued)

Primary Examiner — Frantzy Poinvil
(74) Attorney, Agent, or Firm — Manatt, Phelps & Phillips LLP

(57) ABSTRACT

The present invention is a system and method to sell or procure complementary goods. A complementary good according to the invention is a good whose value or utility is enhanced when paired with another good, such a pair of goods is a communications license to encumbered spectrum and a complementary clearing right to clear the spectrum of its encumbrance. The invention provides automated procedures to facilitate the fashioning and sale of clearing rights so as to enhance the value of the communications license.

54 Claims, 10 Drawing Sheets

U.S. PATENT DOCUMENTS

| | | | |
|---|---|---|---|
| 6,718,312 | B1 | 4/2004 | Milgrom |
| 2001/0049650 | A1 | 12/2001 | Moshal |
| 2002/0013757 | A1 | 1/2002 | Bykowsky |

FOREIGN PATENT DOCUMENTS

| | | |
|---|---|---|
| WO | WO 97/37315 | 10/1997 |

OTHER PUBLICATIONS

Cramton, et al "Efficient Relocation of Spectrum Incumbents" *Journal of Law and Economics*, vol. XLI (Oct. 1998).

R. Wilson, "Auction of Shares" Quarterly Journal of Economics, vo. 94, 1979, pp. 675-689.

Dialog Abstract: File 610, Acc#0489267; "Onsale: Onsale Brings Thrill of Auctions and Bargain Hunting Online; Unique Internet retail service debuts with week-long charity auction for The Computer Museum in Boston"; May 24, 1995.

"Onsale Joins Fray as Online Shopping Picks Up Speed: Internet Booms"; *Computer Reseller News*; p. 73; Jun. 5, 1995; Dialog: File 16, Acc#05649796.

Siegmann; "Nowhere to Go But Up. (Onsale CEO Jerry Kaplan) (PC Week Inside) (Inside People)"; PC Week; v12 n42; p. A5 (1); Oct. 23, 1995; Dialog: File 148, Acc#08222496.

Bidder Information Packet for FCC auction scheduled for Dec. 11, 1995, pp. 33-36, 47, 57-59.

Bidder Information Packet for FCC auction scheduled for Aug. 2, 1995, pp. 99-104.

ACE Market Operations Guide, Sholtz & Associates, LLC, Jan. 3, 1996, pp. 1-5.

J. S. Banks, J. O. Ledyard and D. P. Porter, "Allocating Uncertain and Unresponsive Resources: An Experimental Approach", Rand Journal of Economics, vol. 20, No. 1, Spring 1989, pp. 1-25.

G. Demange, D. Gale and M. Sotomayer, "Multi-Item Auctions", Journal of Political Economy, vol. 4, No. 4, 1986, pp. 863-872.

F. Gul and E. Stacchetti, "English Auctions with Multiple Goods", Princeton University and The University of Michigan, Mimeo, Oct. 12, 1995, pp. 1-20.

R. P. McAfee and J. McMillan, "Auctions and Bidding", Journal of Economic Literature, vol. 25, Jun. 1987, pp. 699-738.

K. A. McCabe, S. J. Rassenti and V. L. Smith, "Testing Vickrey's and Other Simultaneous Multiple Unit Versions of the English Auction," Research in Experimental Economics, vol. 4, Greenwich, CT: JAI Press, 1991, pp. 45-79.

F. M. Menezes, Four Essays on Auction Theory, University of Illinois doctoral dissertation, Feb. 1993, pp. 1-97 and 143-152.

P. R. Milgrom and R. J. Weber, "A Theory of Auctions and Competitive Bidding," Econometrica, vol. 50, No. 5Sep. 1982, pp. 1089-1122.

M. H. Rothkopf, T. J. Teisberg and E. P. Kahn, "Why Are Vickrey Auctions Rare?"Journal of Political Economy, vol. 98, No. 1, 1990, pp. 94-109.

U.S. Department of the Treasury, U.S. Securities and Exchange Commission, and Board of Governors of the Federal Reserve System, Joint Report on the Government Securities Market, Washington, D.C. : U.S.G.P.O., Jan. 1992, pp. ix-xvi, 1-34, B-17-B-24.

W. Vickrey, "Counterspeculation, Auctions, and Competitive Sealed Tenders," Journal of Finance, vol. 16, 1961, pp. 8-37.

W. Vickrey, "Auctions and Bidding Games", Recent Advances in Game Theory, Princeton: Princeton University Conference, 1962, pp. 15-29.

W. Vickrey, "Auctions, Markets, and Optimal Allocation", Bidding and Auctioning for Procurement and Allocation, New York: New York Universy Press 1976, pp. 13-20.

R. J. Weber, "Multiple-Object Auctions", Auctions, Bidding, and Contracting: Uses and Theory, New York: New York University Press, 1983, pp. 165-191.

R. Wilson, "Auction of Shares", Quarterly Journal of Economics, vol. 94, 1979, pp. 675-689.

\* cited by examiner

SYSTEM AND METHOD FOR THE EFFICIENT CLEARING OF SPECTRUM ENCUMBRANCES

FIELD OF THE INVENTION

The present invention relates to improving market mechanisms for the sale or transfer of complementary goods and, more particularly, to the implementation of market mechanisms yielding the efficient clearing of spectrum encumbrances.

BACKGROUND OF THE INVENTION

It is commonplace for goods, tangible or intangible, to be sold or procured by auction or market mechanism. When goods are sold using methods in the art, they are generally either sold one at a time or with like goods sold together. For example, in auctions at traditional auction houses such as Sotheby's or Christies—or in Internet auctions such as eBay—goods are generally sold one at a time in ascending-bid auctions. In auctions such as the U.S. Treasury bond auctions, multiple identical objects (bonds with identical interest payments and maturity dates) are auctioned together in sealed-bid auctions. In auctions such as the Federal Communications Commission's spectrum auctions, telecommunications licenses covering nearby frequencies and covering various regions of the U.S. are auctioned together in ascending-bid auctions. Similarly, when goods are procured using methods in the art, they are generally either procured one at a time or with like goods procured together.

However, standard auction or other market procedures for selling or procuring goods may encounter severe difficulties when there are complementary goods located outside of the auction or market mechanism. Good A and good B are said to be complements when they are most usefully consumed or produced together.

A severe example of complements, which motivates much of the following discussion, is created when a government sells licenses for encumbered telecommunications spectrum. For example, at this writing, the Federal Communications Commission (FCC) is planning to sell new communications licenses in the 700 MHz band in FCC Auction No. 31, currently scheduled for March 2001. Because of its location in the electromagnetic spectrum and its excellent propagation characteristics, the 700 MHz band is ideally suited for next generation (3G) mobile or high-speed broadband telecommunications services. Once deployed, these services will intensify competition for all communication services and yield tremendous benefit to the public. However, the 700 MHz band is the same spectrum currently allocated to UHF television channels 59-69, and some 100 television stations nationally currently operate in this band. Moreover, the current UHF television stations maintain the right to continue to broadcast on this frequency without interference until the end of the digital television (DTV) transition, currently scheduled to extend six or more years beyond the auction date for the new licenses.

This presents a fundamental economic problem. A buyer wishing to provide a new wireless service in the 700 MHz band needs two things: a new license from the FCC; and agreement from incumbent broadcasters in this band to clear the spectrum. The license and the clearing agreements are strong complements; each is of limited usefulness without the other. One can think of the license as a left shoe and the clearing agreements as a right shoe. What a buyer needs is a pair of shoes. The problem is that the government is only auctioning (and, indeed, only owns) left shoes; the right shoes are owned by many different broadcasters. An auction for left shoes by themselves is likely to attract little interest unless the winning bidders can be confident that they will also be able to acquire the corresponding right shoes.

Thus, if the new FCC licenses for the 700 MHz band are sold—as currently planned—in an auction that does not include agreements to clear, severe difficulties can be expected. Bidders in the FCC auction can anticipate that the obtaining of clearing agreements after the auction will be exceedingly costly, as the incumbent broadcasters will be in excellent bargaining positions to extract very high prices from the winners of the new FCC licenses. Moreover, failures in the bargaining process will likely result in many of the encumbrance issues not being resolved for many years, leading to vast underutilization of the spectrum. Understanding this, bidders in the FCC auction are likely to bid very low prices, so the federal government (and taxpayers) will likely receive vastly diminished auction revenues.

SUMMARY OF THE INVENTION

The present invention is a system and method to sell or procure complementary goods. In one especially useful embodiment of the present invention, contracts with incumbent broadcasters to clear the spectrum are aggregated and/or partitioned to create "clearing rights" associated with communications licenses that are being auctioned. In this embodiment, the present invention is a system and method to offer clearing rights that are complementary goods with respect to the communications licenses, facilitating the efficient clearing of spectrum encumbrances. It may enable the bidders in a spectrum auction to bid for clearing rights at the same time that they bid for the basic communications licenses. It may further enable them to make their bids on the clearing rights conditional on winning the basic licenses. This gives the bidders the confidence to bid according to their true economic values for the spectrum. It also minimizes the possibility that post-auction bargaining failures will lead to the inefficient clearing of the spectrum. Thus, the present invention provides the advantage of improving the economic efficiency of the auction or market mechanism over the prior art.

In one preferred embodiment, the present invention comprises a linked auction, described generally as follows. A private company conducts a secondary auction ("clearing auction") for clearing rights at the same time that the FCC conducts the regular FCC auction ("primary auction") for the basic licenses. The bidders in the clearing auction are the same parties ("participating bidders") who bid in the FCC auction. Participation in the clearing auction is purely voluntary, but the process is structured so that all of the likely winners in the FCC auction will have an incentive to participate.

Every time that a participating bidder places a bid on a basic license in the primary auction, it automatically places a linked bid on the associated clearing rights in the clearing auction, where the amount of the linked bid is given by a predetermined mathematical formula ("linkage formula"). A participating bidder who wins one or more basic licenses in the primary auction also wins the associated clearing rights in the clearing auction, and is required to make a payment based upon its bids in the primary auction and upon the linkage formula. A participating bidder who does not win any basic licenses will typically not win any clearing rights, and the linkage formula will typically not require the losing bidder to make any payment.

One exemplary linkage formula is a simple one-to-one relationship. For every dollar of a winning bid in the primary auction, a participating bidder is obligated to pay an equal sum for the clearing rights. One exemplary division of the revenues from the clearing auction is to divide the revenues proportionately among the incumbent UHF television stations. Every dollar paid for clearing rights in a given region is allocated among the individual stations in a region in proportion to the population or number of households within their respective grade B contours.

In a second preferred embodiment, the present invention comprises an unlinked auction, described generally as follows. Again, a private company conducts a clearing auction at the same time that the FCC conducts the primary auction. Participating bidders are permitted to concurrently place bids on clearing rights in the clearing auction. Bids are not rigidly linked to bids in the primary auction, but bids for the clearing rights are nevertheless constrained to satisfy some mathematical relationship relative to bids for the basic communications licenses. One exemplary constraint for the unlinked auction is a simple greater-than-or-equal-to-one relationship. For every bid in the primary auction, a participating bidder is obligated to bid at least an equal sum for the clearing rights. Winners of the primary auction win the basic licenses, and winners of the clearing auction win the clearing rights. Optionally, the obligation of a winning bidder of the clearing auction to purchase the clearing rights may be made conditional on whether the bidder has won the associated basic license in the primary auction.

In the above descriptions of the linked and unlinked auction, the clearing auction was described as occurring at the same time as the primary auction. The above descriptions could be modified by replacing "at the same time as" with "before" or "after", and this would still constitute a description of an embodiment of the present invention. However, we believe at this time that the present invention offers the best performance when "at the same time as" is used.

The "clearing rights," as used in the above description, are created by taking contracts with incumbent broadcasters to clear the spectrum, and aggregating and/or partitioning them to form goods that are more nearly coextensive with the associated communications licenses. In turn, each contract underlying the clearing rights could be an unconditional sales contract of the obligation to cease over-the-air broadcasting on the frequency and at the location in question, or it could be any other derivative rights as to the ownership of the television station or the use of the spectrum. For example, it could be an option to demand cessation of over-the-air broadcasting for a predetermined strike price, or for a menu of different strike prices depending on the time of exercise that is chosen. Alternatively, it could be an unconditional contract, option contract, or other agreement to relocate the use of spectrum to a different frequency or to a different mode of delivery. The contract underlying the clearing rights could also be made conditional on the television station receiving all required regulatory approvals. Finally, it could be a contract for the sale of the television station in its entirety.

Auctions or market mechanisms following the above procedures can be conducted entirely on a computer, entirely manually, or with some aspects conducted on a computer and other aspects conducted manually. Computerized conduct of the auction allows the auction to be conducted swiftly and reliably, even if bidders are not located on-site. Computerized conduct of the auction also allows the auction to be conducted with all bidding information taken into account, while controlling the degree to which the information itself is disclosed to the participants. The amount of information that is transmitted to the bid entry terminals and/or actually displayed to the bidders—and the time at which it becomes available—may be carefully controlled. In one embodiment, all bidding information is displayed to the bidders. In another embodiment, only the provisionally-winning bids, without bidder identities, are displayed. A number of intermediate embodiments are also possible, in which some but not all bidding information is displayed to the bidders. Finally, computerized conduct of the auction facilitates the utilization of combinatorial bidding or other auction algorithms that may be computationally quite intensive.

There may be advantages in implementing some aspects of the present invention on a computer and implementing other aspects of the invention manually. For example, in one preferred embodiment of the "linked auction" described herein, the linkage between the primary auction revenues and the clearing payments is manually-implemented, while the bidding in the primary auction is computer-implemented.

An auction or market mechanism following these procedures can be conducted by a single entity, or the procedures can instead be decentralized among two or more separate entities. For example, in one of the preferred embodiments, a government agency (such as the FCC) conducts the primary auction of the basic licenses and a private company (such as Spectrum Exchange Group, LLC) conducts the linked auction. In another embodiment, the government agency conducts both the primary auction and the linked auction. In another embodiment, the government agency delegates the primary auction to a private company, which also conducts the linked auction.

The present invention is useful for conducting auctions involving objects offered for sale by the bidders, as well as objects offered for sale to the bidders. The auction procedures may utilize prices that ascend and/or descend, as well as sealed-bid auctions. The term "bid" includes both offers to sell and offers to buy. Moreover, any references to "quantities being offered" include both "quantities being sold" by the auctioneer, in the case this is an auction for selling objects, as well as "quantities being bought or procured" by the auctioneer, in the case this is an auction for buying objects or procuring objects.

Throughout this document, the terms "objects", "licenses", "items", "units" and "goods" are used essentially interchangeably. The inventive system may be used both for tangible objects, such as real or personal property, and intangible objects, such as telecommunications licenses or electric power. The inventive system may be used in auctions where the auctioneer is a seller, buyer or broker, the bidders are buyers, sellers or brokers, and for auction-like activities which cannot be interpreted as selling or buying. The inventive system may be used for items including, but not restricted to, the following: public-sector bonds, bills, notes, stocks, and other securities or derivatives; private-sector bonds, bills, notes, stocks, and other securities or derivatives; communication licenses and spectrum rights; clearing, relocation or other rights concerning encumbrances of spectrum licenses; electric power and other commodity items; rights for terminal, entry, exit or transmission capacities or other rights in gas pipeline systems; airport landing rights; emission allowances and pollution permits; and other goods, services, objects, items or other property, tangible or intangible. It may be used in initial public offerings, secondary offerings, and in secondary or resale markets.

The communication system used, if any, can be any system capable of providing the necessary communication and includes for example a local or wide area network such as for example ethernet, token ring, or alternatively a telephone system, either private or public, the Internet, or the World Wide Web.

DETAILED DESCRIPTION OF PREFERRED EMBODIMENTS

The drawings of FIGS. 1-4 of U.S. Pat. No. 6,026,383 and of FIGS. 1-12 of U.S. Pat. No. 5,905,975, and the associated texts, provide a general superstructure for the present method and system, especially as it relates to the computer implementation thereof. Moreover, the terminology established in the previous patents will be relied upon as needed.

Figure 1:
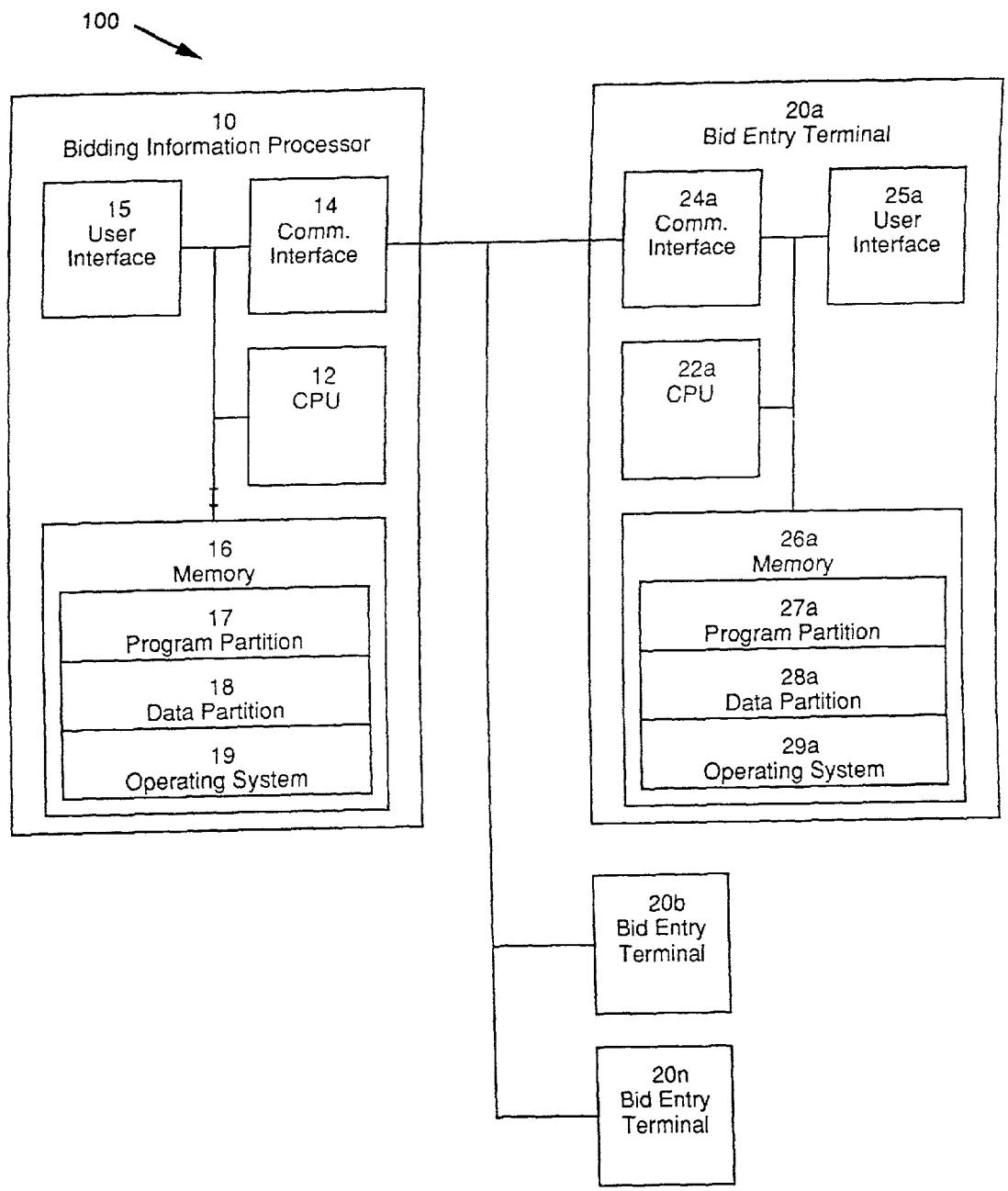
FIG. 1 is an exemplary block diagram of an auction system in accordance with the invention.

Before describing how the market mechanism process is implemented, reference is made to FIG. 1 to describe an exemplary block diagram of one embodiment of a system in accordance with the present invention. As illustrated in FIG. 1, the system includes an auctioneer's system 10 (sometimes also referred to as a Bidding Information Processor or BIP) and a plurality of user systems 20a, 20b and so on (sometimes also referred to as Bid Entry Terminal or BET), each user system 20a, etc. represents an individual bidder. The systems 10-20n are communicatively interconnected via a communication system represented by the illustrated connections. The communication system can represent any system capable of providing the necessary communication to/from BIP and BET and includes for example a local or wide area network such as for example ethernet, token ring, or alternatively a telephone system, either private or public, the Internet or the World Wide Web. Each of the systems 10-2n includes a typical user interface 15, 25a for input/output and can include a conventional keyboard, display, and other conventional I/O devices. Within each of the systems, the user interface (15, 25a, etc.) is coupled to a communication interface (14, 24a, etc.) which is in turn connected to the communication system. Both the user interface and communication interface are also connected, at each system, to a CPU (12, 22a, etc.). Each system includes a memory (16, 26a, etc.) which can further be broken down into a program partition (17, 27a, etc.), a data partition (18, 28a, etc.) and an operating system partition (19, 29a, etc.). In each system the CPU (12, 22a, etc.) represents a source of intelligence when executing instructions from the memory (16, 26a, etc.) so that appropriate input/output operations via the user interface and the communications interface take place as is conventional in the art. The particular steps used in implementing the inventive system and method are described in more detail below. In one embodiment, each of the systems are personal computers, workstations or servers.

Figure 2:
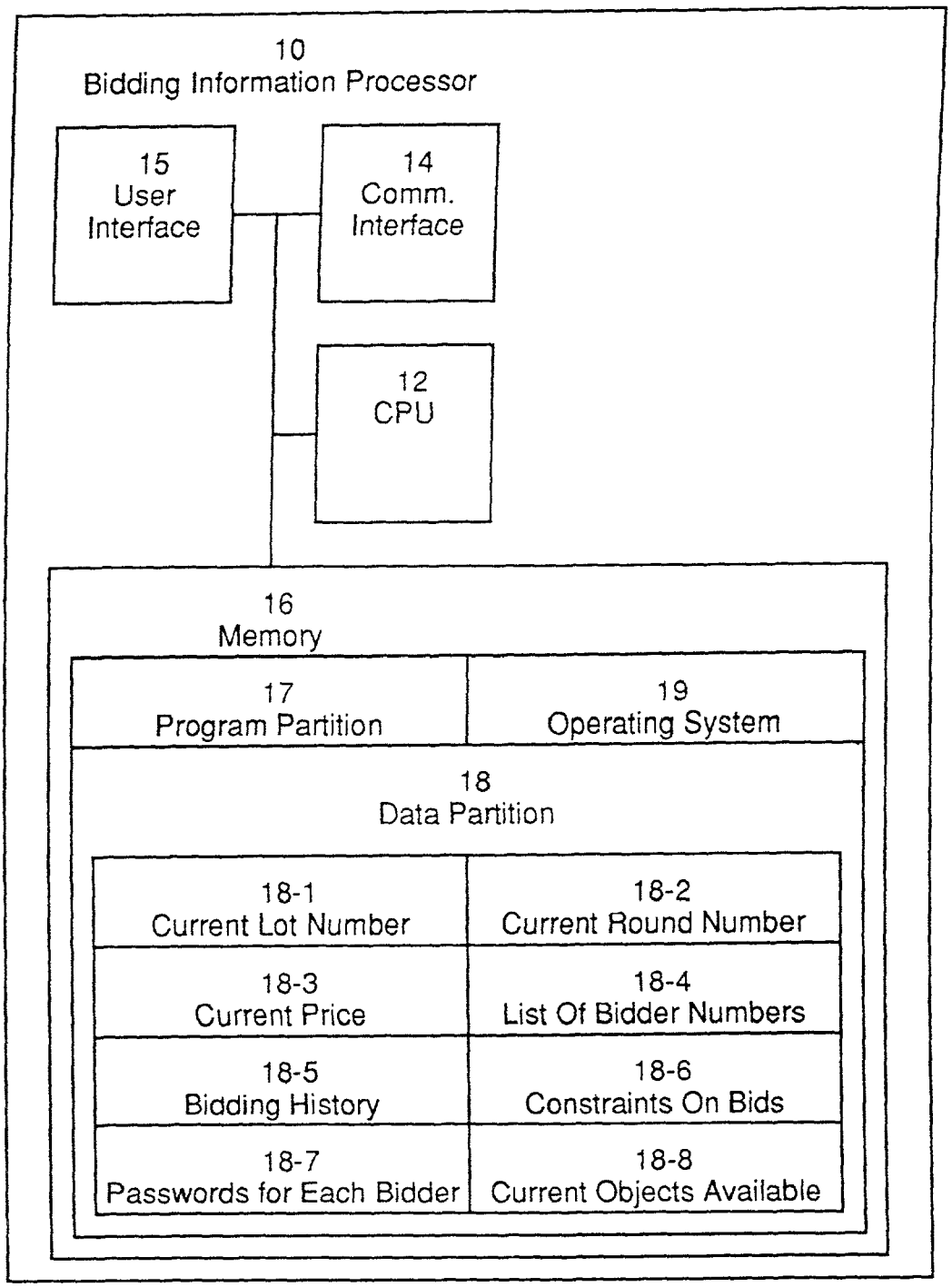
FIG. 2 is a detail of one element of the system of FIG. 1.

FIG. 2 is a more detailed illustration of an exemplary BIP 10 showing details of the data partition 18. As seen in FIG. 2 the data partition includes provision for creating, storing, processing and outputting values representing Current Lot Number 18-1, Current Round Number 18-2, Current Price 18-3, List of Bidder Numbers 18-4, Bidding History 18-5, Constraints on Bids 18-6, Passwords, 18-7 and Current Objects Available 18-8. The particular set of data required for implementing any particular market mechanism and the format of that datum or data (such as scalar, vector, list, etc.) is more particularly specified by the detailed description of that market mechanism.

In the following description, the complementary goods of interest will be identified throughout as "licenses" and "clearing rights" (following the motivation of the problem of spectrum encumbrances), but they could just as readily be generic "objects", "items", "units" or "goods", and the language used will not in any way limit the applicability of the system and method outside the area of communications licenses.

Embodiments of a "Linked Auction" Process

Several of the preferred embodiments of the inventive system and method take the form of a "linked auction." Every time that a bidder participating in the clearing auction places a bid on a license or a set of licenses, the bidder effectively also places a linked bid on the associated clearing rights. The clearing rights are only won—and so the linked bid is only paid—in the event that the participating bidder wins one or more licenses. Therefore, it is only necessary to actually compute the linked bids at the time that the auction for licenses ends, and only for the winners of licenses. Nevertheless, the participating bidder would generally want to keep track of its linked bids, as just like bids on the licenses, these become the contractual obligations of the bidder upon winning. The amount of the linked bid is given by a predetermined mathematical formula, henceforth referred to as the linkage formula.

One exemplary linkage formula is given by a simple linkage ratio. If the amount of the linked bid is characterized by a linkage ratio, R, this means that every bid of b for a license is effectively linked to a bid of Rb for the associated clearing rights. For example, if the linkage ratio R=1, then every bid for a license is effectively matched, dollar for dollar, by an equal linked bid for the associated clearing rights. However, the linkage formula may also be much more complicated. It also may contain a constant term, or it may include a minimum price or a reserve price. It may also be any nonlinear function of the amount bid for the license. Finally, while the subsequent notation will not reflect this for expositional simplicity, the linkage formula for one license may depend on the bids that are placed on other licenses, and may depend on other external indices and events.

Given this framework, there is no need in the linked auction for participating bidders to explicitly submit distinct bids for the complementary goods. All that the participating bidders need to do is to agree to be contractually bound by the linkage formula, and then submit bids for the primary goods. Indeed, one way of describing a linked auction is a method for implementing an auction of a set of first objects (e.g., the basic communications licenses) and one or more complementary second objects (e.g., the associated clearing rights), at least one first object having a complementary second object, two or more bidders participating in the auction, the method comprising: initiating an auction by identifying available objects to bidders; inputting bids for first objects from bidders; determining, based on the said bids, whether the auction should continue; repeating the inputting and determining until the auction is terminated; assigning the first objects to bidders based on the bids in force at the time the auction was terminated; and assigning a complementary second object to a successful bidder for a first object, based on the bids for the first objects. In many embodiments, some or all of these steps are implemented on the computer system described in FIGS. 1 and 2. In particular, the technology previously described in U.S. Pat. Nos. 6,026,383 and 5,905,975 can readily be used for implementing the initiating, inputting, determining, repeating, and assigning steps; or for implementing the inputting, determining, and repeating steps only.

Figure 3:
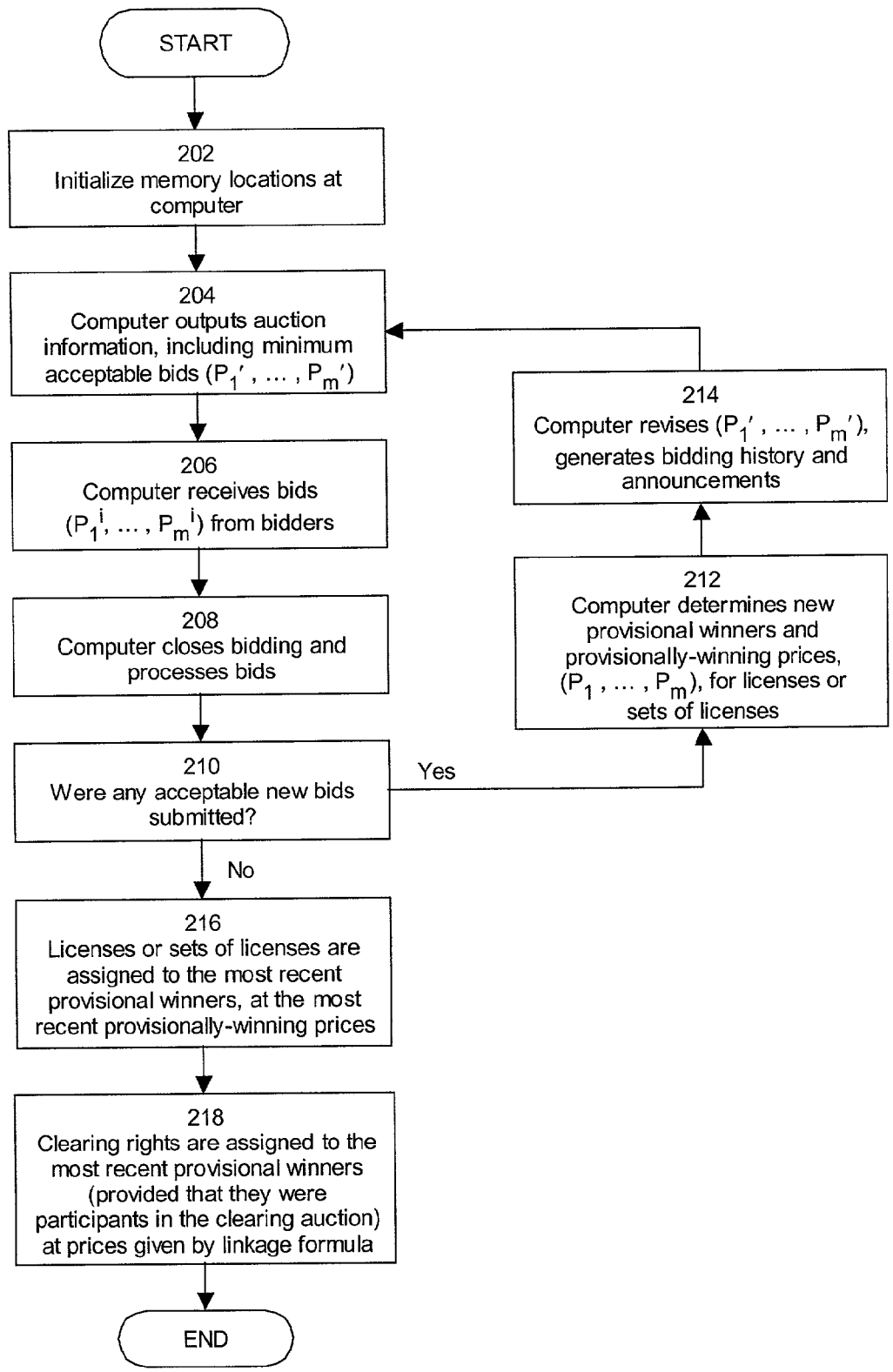
FIG. 3 is a flow diagram of an auction process in accordance with one embodiment of the invention.

FIG. 3 is a flow diagram of a "linked auction" process in accordance with one embodiment of the present invention. The process starts with step 202, in which memory locations at the computer are initialized. In step 202, the appropriate memory locations are initialized with information such as the licenses (or, generally, first objects) for auction and the initial minimum acceptable bids. In step 204, the computer outputs auction information, including the current minimum acceptable bids ($P_1', \ldots, P_m'$) for licenses. In step 206, the computer receives bids ($P_1^i, \ldots, P_m^i$) for licenses from bidders. In step 208, the computer closes the bidding for the current round and processes bids. In step 210, the computer determines whether the bidding should continue beyond the current round. In many of the preferred embodiments, this determination is simply based on whether any acceptable new bids were submitted in the current round. If, at step 210, the computer determines that one or more acceptable new bids were submitted in the current round—and so the bidding should continue—then the process goes to step 212, in which the computer determines new provisional winners and provisionally-winning prices ($P_1, \ldots, P_m$). The process then goes to step 214 in which the computer revises the current minimum acceptable bids ($P_1', \ldots, P_m'$) and generates the bidding history and any auction announcements and messages. The process then loops to step 204.

If, at step 210, the computer determines no acceptable new bids were submitted in the current round—and so the bidding should end—then the process proceeds to step 216. At step 216, licenses (or, generally, first objects) are assigned to the most recent provisional winners, at the most recent provisionally-winning prices. At step 218, clearing rights (or, generally, second objects) are assigned to the most recent provisional winners—provided that they were participants in the clearing auction—at prices given by the linkage formula. This step is shown in greater detail in FIG. 4. After step 218, the market mechanism process ends.

In one preferred embodiment—related to the simultaneous multiple round auction format used by the FCC—there are m licenses (or, generally, first objects) for auction. For any k ($1 \leq k \leq m$), a bid $P_k^i$ corresponds to a price offered by bidder i for license $S_k$. A new bid $P_k^i$ is acceptable if $P_k^i \geq P_k'$, the minimum acceptable bid for license $S_k$. In this embodiment, the rule for determining the new provisional winner of license $S_k$ is: the bidder who submitted the highest new acceptable bid for license $S_k$, if any new acceptable bid for license $S_k$ was submitted; and the previous provisional winner, otherwise. In this embodiment, the new provisionally-winning price for license $S_k$ is the bid for license $S_k$ associated with the new provisional winner. In the event that two or more new acceptable bids of equal amount were submitted for license $S_k$, a tie-breaking rule is used such as accepting the bid with the earlier time stamp. In the event that no acceptable bids have yet been submitted for license $S_k$, the provisional winner is listed as being the Auctioneer. One exemplary rule for revising the minimum acceptable bid, $P_k'$, is to simply take the current provisionally-winning price and multiply it by (1+c), where c is a positive constant such as 5%. However, if the provisional winner is still listed as being the Auctioneer, then the previous minimum acceptable bid is maintained. Obviously, more complicated rules for revising the minimum acceptable bid are also possible.

In a second preferred embodiment—related to some combinatorial auction formats proposed for the FCC—there are h licenses (or, generally, first objects) for auction, but bidders are permitted to submit bids on sets of licenses. Let m denote the number of sets of licenses for which bids may be submitted. For any k ($1 \leq k \leq m$), a bid $P_k^i$ then corresponds to a price offered by bidder i for the set $S_k$ of licenses. A new bid $P_k^i$ is acceptable if $P_k^i \geq P_k'$, the minimum acceptable bid for the set $S_k$. In this embodiment, the rule for determining the new provisional winner of each set is more complicated. The computer first calculates the provisionally-winning combination: the collection of bids on disjoint sets that maximizes the total auction revenues. (In other words, the computer can only designate a bid on set $S_j$ and a bid on set $S_k$ as both part of the provisionally-winning combination if $S_j$ and $S_k$ are non-intersecting sets: otherwise, the same license is being provisionally assigned to two different bidders.) In this embodiment, if a bid on set $S_k$ is calculated to be part of the provisionally-winning combination, then the new provisional winner of set $S_k$ is the bidder who has submitted the highest acceptable bid for set $S_k$. The new provisionally-winning price for set $S_k$ is the bid for set $S_k$ associated with the new provisional winner. In the event that two or more acceptable bids of equal amount were submitted for set $S_k$, a tie-breaking rule is used such as accepting the bid with the earlier time stamp or selecting randomly from among the tied bids. In the event that set $S_k$ is not part of the provisionally-winning combination, then the provisional winner of set $S_k$ is listed as being the Auctioneer. One exemplary rule for revising the minimum acceptable bid, $P_k'$, is to simply take the current provisionally-winning price and multiply it by (1+c), where c is a positive constant such as 5%. However, if the provisional winner is still listed as being the Auctioneer, then the previous minimum acceptable bid is maintained. Obviously, more complicated rules for revising the minimum acceptable bid are also possible.

Figure 4:
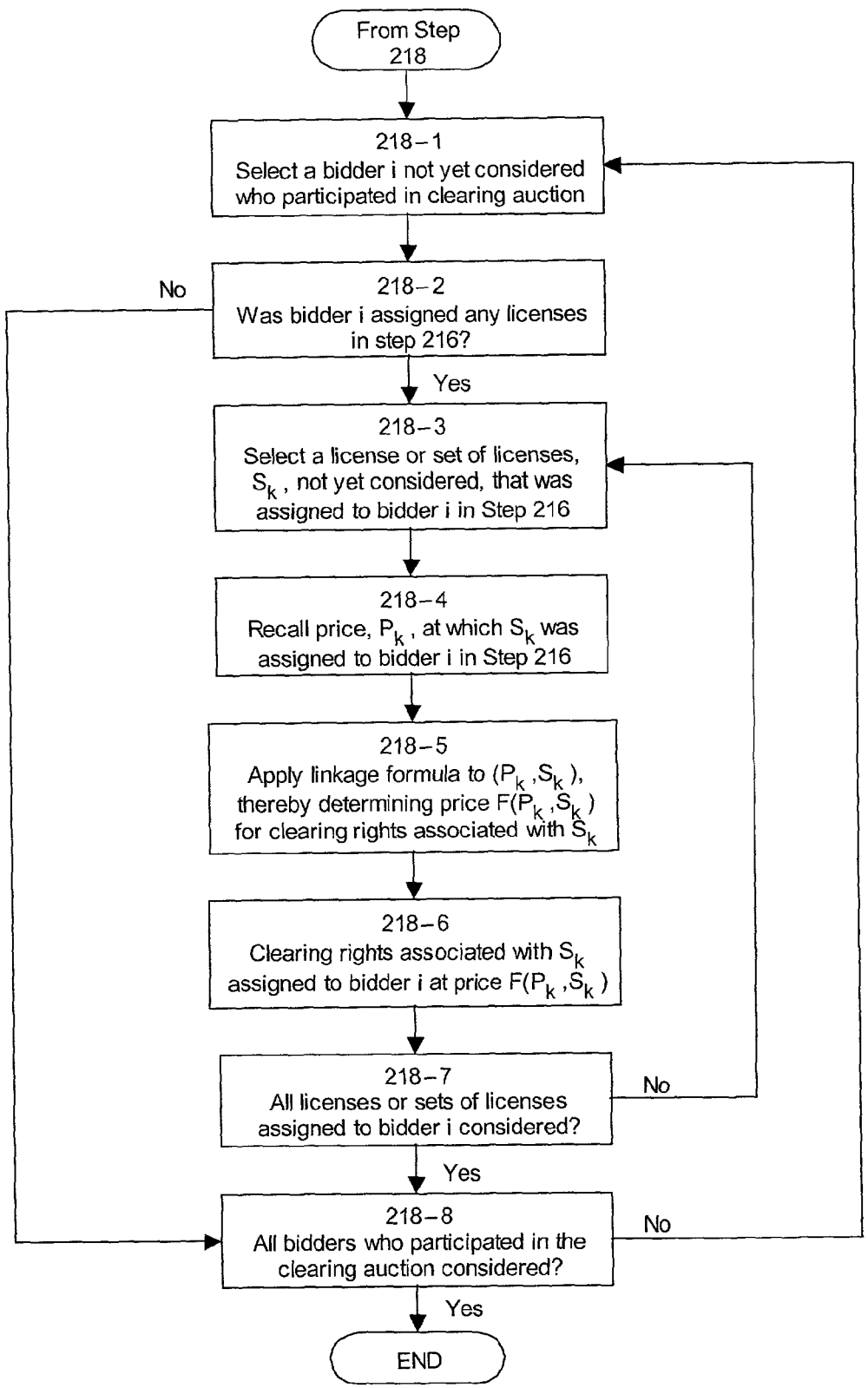
FIG. 4 is a flow diagram illustrating, in greater detail, an element of the diagram of FIG. 3.

FIG. 4 is a flow diagram of the process of step 218. It begins with step 218-1, in which a bidder i who has not yet been considered, but who is a participant in the clearing auction, is selected. In step 218-2, for the bidder i currently selected, it is determined whether bidder i was assigned any licenses (or, generally, first objects) in step 216. If it is determined that bidder i was not assigned any licenses in step 216, then the process proceeds directly to step 218-8 where another bidder is selected. If it is determined that bidder i was assigned one or more licenses in step 216, then the process continues with step 218-3, in which a license or set of licenses, $S_k$, that has not yet been considered and that was assigned to bidder i in step 216 is selected. The process then continues with step 218-4, in which the price $P_k$ at which the set $S_k$ was assigned is recalled. In step 218-5, the linkage formula F(•,•) is applied to ($P_k, S_k$), thereby determining the price F($P_k, S_k$) that will be charged for the clearing rights (or, generally, second objects) associated with the set $S_k$. In step 218-6, the clearing rights (or, generally, second objects) associated with the set $S_k$ are assigned to bidder i at price F($P_k, S_k$). In step 218-7, it is determined whether all licenses or sets of licenses that were assigned to bidder i in step 216 have been considered. If not, the process loops back to step 218-2. If all licenses or sets of licenses that were assigned to bidder i in step 216 have been considered, the process goes to step 218-8, where it is determined whether all bidders who were participants in the clearing auction have been considered. If not, the process loops back to step 218-1. If all bidders who were participants in the clearing auction have been considered, the process returns to FIG. 3; and since it is at the last step of FIG. 3, it ends.

The embodiments of the "linked auction" that we have described thus far have assumed that the linkage formula is determined in advance. The next embodiments that we will now describe include, as part of the process, a determination of the linkage formula.

The determination of the right linkage formula is a delicate balancing act, but fortunately, when participation in the mechanism is voluntary, the parties possess the right incentives to select an appropriate number. At first glance, it might appear that the bidders would have every incentive to try to set the linkage as low as possible, while the owners of the clearing rights would have every incentive to set the linkage as high as possible. But the parties also possess strong countervailing incentives. The incentives are not as simple as they may superficially appear, facilitating reasonable agreement.

The fact of voluntary participation by bidders effectively disciplines the incumbent broadcasters from trying to set the linkage too high. The linkage formula drives a wedge between the price effectively paid for the licenses by a participating bidder versus a nonparticipating bidder. If the wedge is set excessively large, any bidder will find it preferable to decline participating in the clearing auction: with too large a wedge, purchase of the license without the associated clearing rights is a better deal. Thus, an excessively high linkage discourages bidders from participating in the clearing auction and increases the likelihood that nonparticipants win the licenses, undercutting the objectives of the owners of the clearing rights.

The fact of voluntary participation by owners of the clearing rights effectively disciplines the bidders from trying to set the linkage too low. For suppose that the bidders insist on making the linkage too small. Then many of the owners will refuse to tender their clearing rights, and many of these will not be offered in the clearing auction, undercutting the bidders' objectives. Meanwhile, each bidder should not have a problem with agreeing in advance to a linkage that adequately compensates the owners of the clearing rights. With a predetermined cost to clearing, the bidder can simply subtract the cost of clearing from its value for clear spectrum, and bid for the licenses accordingly. With each bidder subject to the same linkage formula, there is a level playing field on clearing terms, and the bidder is neither advantaged nor disadvantaged.

Figure 5:
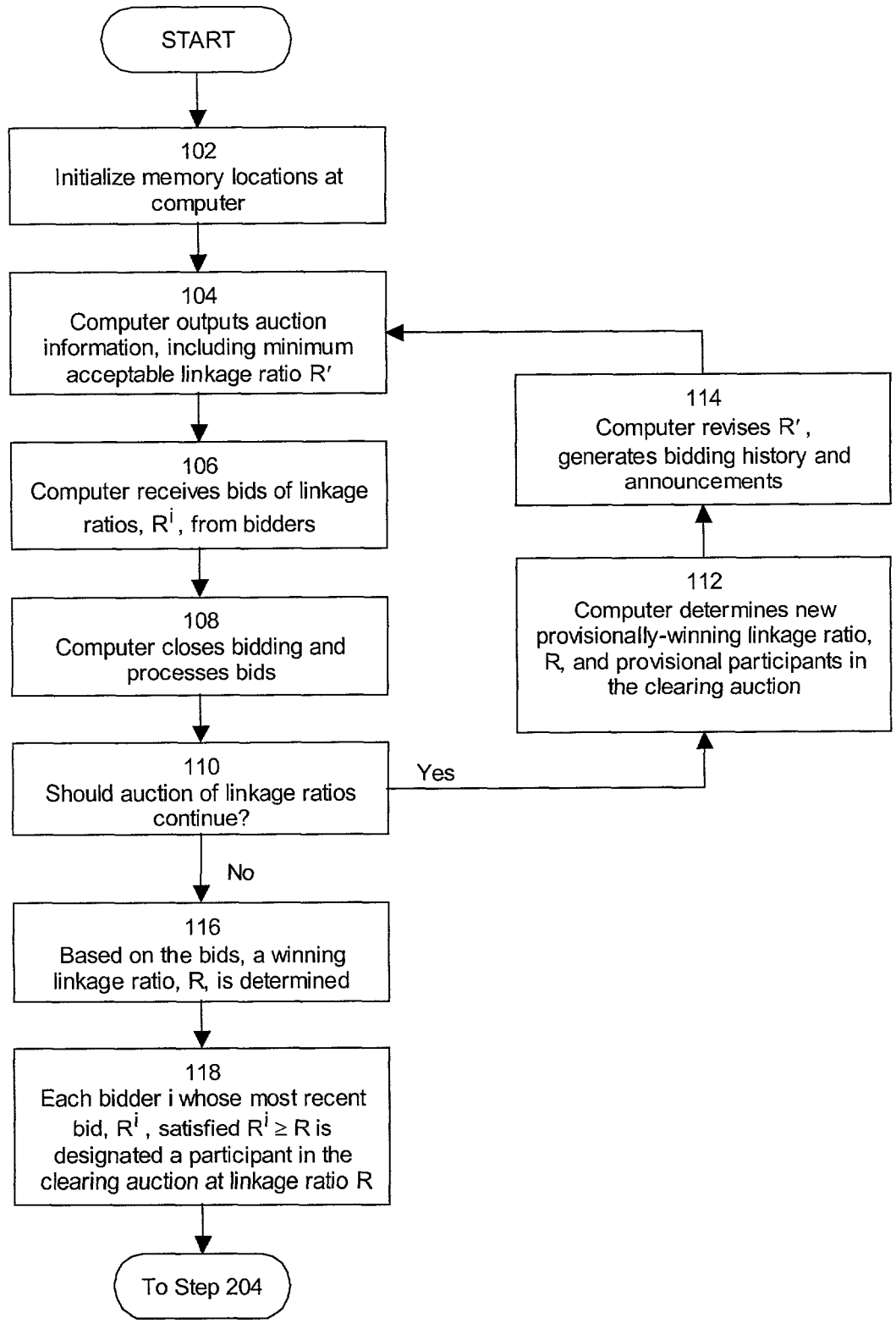
FIG. 5 is a flow diagram of another embodiment of the invention that includes the process of FIG. 3.

In the embodiment of the invention illustrated in FIG. 5, the linkage ratio is determined by an auction among the bidders for licenses. In the embodiment of the invention illustrated in FIG. 6, the linkage formula is specified by the auctioneer, by the government, or by the owners of the clearing rights, and each bidder is given an opportunity to agree to these terms or to decline them.

FIG. 5 is a flow diagram of another embodiment of the invention that includes the process of FIG. 3. The process starts with step 102, in which memory locations at the computer are initialized. In step 102, the appropriate memory locations are initialized with information such as the initial minimum acceptable linkage ratio R'. In step 104, the computer outputs auction information, including the current minimum acceptable linkage ratio R'. In step 106, the computer receives bids $R^i$ from bidders. In step 108, the computer closes the bidding for the current round and processes bids. In step 110, the computer determines whether the auction of linkage ratios should continue beyond the current round. In some embodiments, this determination step is unnecessary, as the auction of linkage ratios is simply conducted in a single round of sealed bids; the auction of linkage ratios never continues beyond step 110. In other embodiments, this determination is simply based on whether any acceptable new bids of linkage ratios were submitted in the current round. If, at step 110, the computer determines that the bidding should continue, then the process goes to step 112, in which the computer determines a new provisionally-winning linkage ratio, R, and new provisional participants in the clearing auction. In many embodiments, these would be determined by the same procedures as in steps 116 and 118, below. The process then goes to step 114 in which the computer revises the current minimum acceptable linkage ratio R' and generates the bidding history and any auction announcements and messages. The process then loops to step 104.

If, at step 110, the computer determines that the auction of linkage ratios should not continue, then the process proceeds to step 116. At step 116, based on the bids, a winning linkage ratio, R, is determined. In some embodiments, the winning linkage ratio is simply determined to be the highest linkage ratio that is bid by any bidder. In other embodiments, the winning linkage ratio is determined so that two or more bidders' bids are greater than or equal to the winning linkage ratio. The determination may depend, in part, on how close together the bidders' bids are located, and the perceived probability that the respective bidders will win in the auction of licenses that follows beginning at step 204. At step 118, each bidder i whose most recent bid, R', satisfied R'≧R is designated to be a participant in the clearing auction. The process then proceeds to step 204 of FIG. 3, which begins the auction of licenses together with the clearing auction. In what follows in FIG. 3, the linkage formula shall simply be given by $F(P_k, S_k)=RP_k$, where R is the winning linkage ratio determined in step 116.

Figure 6:
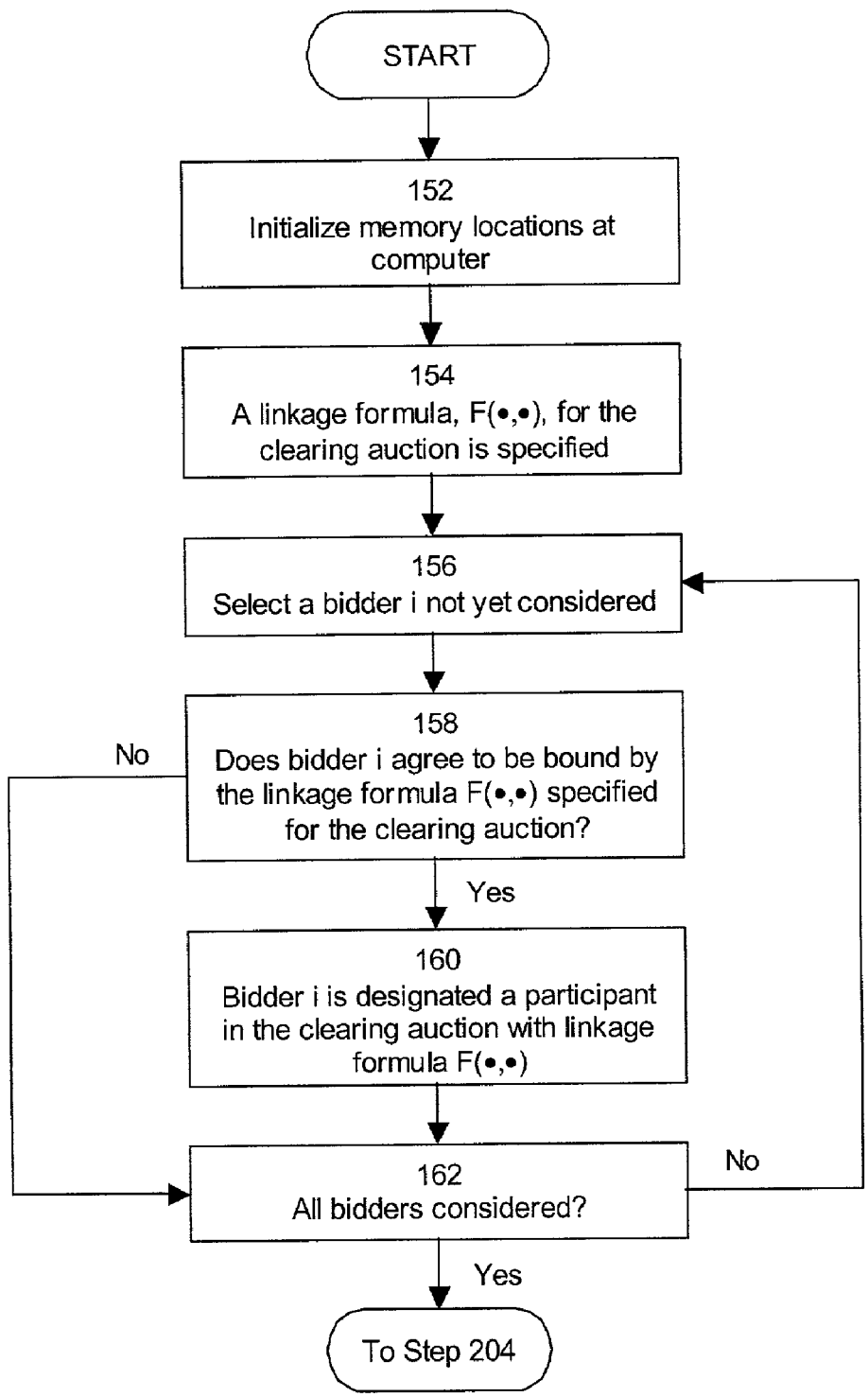
FIG. 6 is a flow diagram of another embodiment of the invention that also includes the process of FIG. 3.

FIG. 6 is a flow diagram of another embodiment of the invention that includes the process of FIG. 3. The process starts with step 152, in which memory locations at the computer are initialized. In step 154, a linkage formula, F(•,•), for the clearing auction is specified. In a typical embodiment of this type, the linkage formula will be specified by the auctioneer, by the government, or by the owners of the clearing rights. In step 156, a bidder i who has not yet been considered is selected. In step 158, bidder i indicates whether he agrees to be contractually bound by the linkage formula, F(•,•), specified for the clearing auction. If bidder i is not willing to be contractually bound by the said linkage formula, then the process proceeds directly to step 162 where another bidder is selected. If bidder i indicates that he is willing to be contractually bound by the said linkage formula, then the process goes to step 160 where bidder i is designated a participant in the clearing auction with linkage formula F(•,•). The process then goes to step 162, where it is determined whether all bidders have been considered. If not, the process loops back to step 156. If all bidders have been considered, the process proceeds to step 204 of FIG. 3, which begins the auction of licenses together with the clearing auction. The clearing auction occurs using the linkage formula F(•,•) that was specified in step 154, and with all bidders who were designated in the various repetitions of step 160 as participants.

Embodiments of an "Unlinked Auction" Process

Several of the preferred embodiments of the inventive system and method take the form of an "unlinked auction." The clearing rights are put up for auction, in either the same auction or a separate auction as the communications licenses. Bids for the clearing rights are not rigidly linked to bids for the communications licenses, but bids for the clearing rights are nevertheless constrained to satisfy some mathematical relationship relative to bids for the communications licenses.

One exemplary constraint for the unlinked auction is a requirement that each bid for a clearing right must be greater than or equal to the number yielded by a simple linkage ratio, R. This means that if the standing high bid for a license equals b, then the bid for the associated clearing rights is required to be at least Rb. However, the constraint may also be much more complicated. It also may contain a constant term, or it may include a minimum price or a reserve price. It may also be any nonlinear function of the amount bid for the license. Finally, while the subsequent notation will not reflect this for expositional simplicity, the constraint for bids on one clearing right may depend on the bids that are placed on other licenses, and may depend on other external indices and events. In addition to applying this constraint, the standard rules for an auction are applied. For example, a bid for a given clearing right may be required to be at least the previous high bid plus a minimum bid increment.

In contrast to the linked auction, bidders in the unlinked auction do need to explicitly submit distinct bids for the clearing rights. One way of describing an unlinked auction is a method of implementing an auction of a set of second objects (e.g., clearing rights) constrained by a related auction of first objects (e.g., communication licenses), at least one first object having a complementary second object, two or more bidders participating in the auction, the method comprising: initiating an auction by identifying available second objects to bidders; inputting bids for second objects from bidders, where an acceptable bid for a second object is constrained by a bid for a complementary first object in the related auction; determining, based on the said bids, whether the auction should continue; repeating the inputting and determining until the auction is terminated; and assigning the second objects to bidders based on the bids in force at the time the auction was terminated. In many embodiments, some or all of these steps are implemented on the computer system described in FIGS. 1 and 2. In particular, the technology previously described in U.S. Pat. Nos. 6,026,383 and 5,905,975 can readily be used for implementing the initiating, inputting, determining, repeating, and assigning steps; or for implementing the inputting, determining, and repeating steps only.

Figure 7:
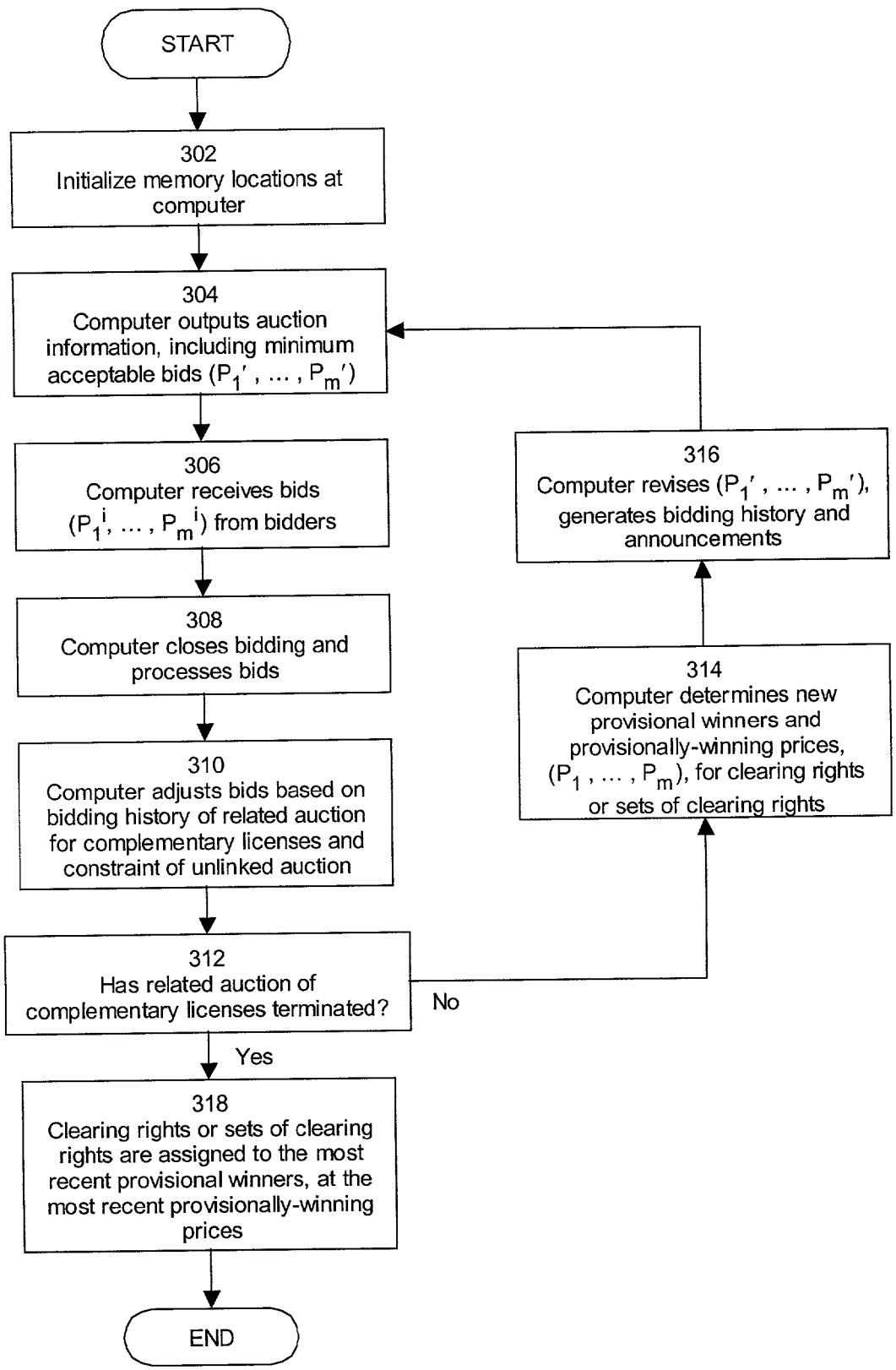
FIG. 7 is a flow diagram of an auction process in accordance with another embodiment of the invention.

FIG. 7 is a flow diagram of an "unlinked auction" process in accordance with one embodiment of the present invention. The process starts with step 302, in which memory locations at the computer are initialized. In step 302, the appropriate memory locations are initialized with information such as the clearing rights (or, generally, second objects) for auction and the initial minimum acceptable bids. In step 304, the computer outputs auction information, including the current minimum acceptable bids $(P_1', \ldots, P_m')$ for clearing rights. In step 306, the computer receives bids $(P_1^i, \ldots, p_m^i)$ for clearing rights from bidders. In step 308, the computer closes the bidding for the current round and processes bids. In step 310, the computer adjusts the bids based on the bidding history of the related auction for complementary licenses, and using the constraint on bids that defines the unlinked auction. This step is shown in greater detail in FIG. 8. In step 312, the computer determines whether the bidding should continue beyond the current round. In many of the preferred embodiments, this determination is simply based on whether the related auction of complementary licenses has terminated. If, at step 312, the computer determines that the related auction of complementary licenses has not terminated—and so the bidding for clearing rights should continue—then the process goes to step 314, in which the computer determines new provisional winners and provisionally-winning prices $(P_1, \ldots, P_m)$. The process then goes to step 316 in which the computer revises the current minimum acceptable bids $(P_1', \ldots, P_m')$ and generates the bidding history and any auction announcements and messages. The process then loops to step 304.

If, at step 312, the computer determines that the related auction of complementary licenses has terminated—and so the bidding for clearing rights should also end—then the process proceeds to step 318. At step 318, clearing rights (or, generally, second objects) are assigned to the most recent provisional winners, at the most recent provisionally-winning prices. After step 318, the market mechanism process ends.

Two preferred embodiments of the unlinked auction—one related to the simultaneous multiple round auction format used by the FCC and one related to some combinatorial auction formats proposed for the FCC—follow the same description as in the section, above, on the linked auction (in the two paragraphs immediately following the detailed description of FIG. 3).

Figure 8:
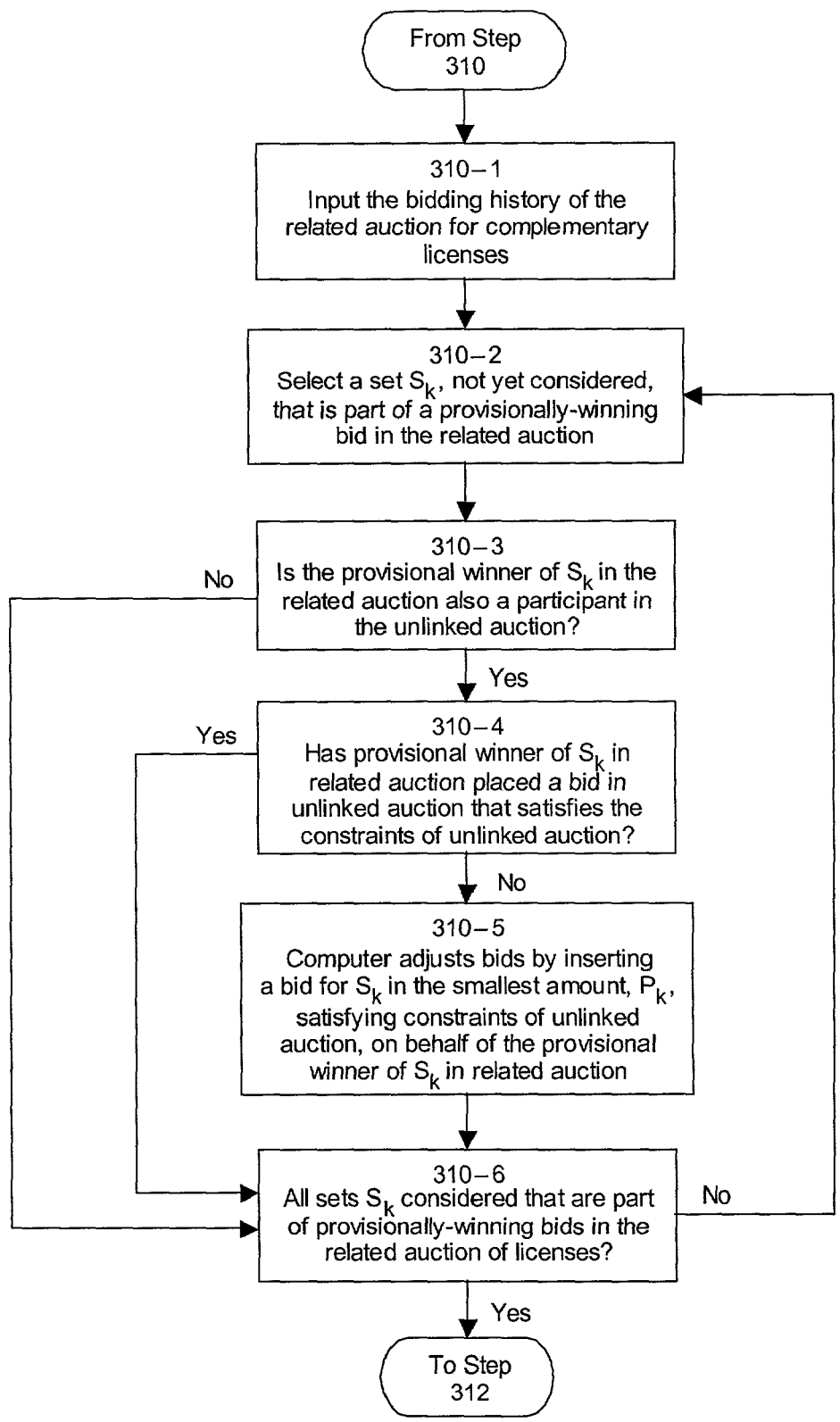
FIG. 8 is a flow diagram illustrating, in greater detail, an element of the diagram of FIG. 7.

FIG. 8 is a flow diagram of the process of step 310. It begins with step 310-1, in which the bidding history of the related auction for complementary licenses is inputted or accessed. In step 310-2, a set $S_k$ that has not yet been considered, but which is part of a provisionally-winning bid in the related auction, is selected. In step 310-3, for the set $S_k$ currently selected, it is determined whether the provisional winner of set $S_k$ in the related auction is also a participant in the unlinked auction. If the provisional winner of set $S_k$ is not a participant in the unlinked auction, then the process skips to step 310-6 where another set $S_k$ is selected. If the provisional winner of set $S_k$ is a participant in the unlinked auction, then the process continues with step 310-4. In step 310-4, for the set $S_k$ currently selected, it is determined whether the provisional winner of set $S_k$ in the related auction has placed a bid in the unlinked auction that satisfies the constraints of the unlinked auction. If the provisional winner of set $S_k$ in the related auction has placed a bid in the unlinked auction satisfying the constraints of the unlinked auction, then the process skips to step 310-6 where another set $S_k$ is selected. If the provisional winner of set $S_k$ in the related auction has not placed a bid in the unlinked auction satisfying the constraints of the unlinked auction, then the process proceeds to step 310-5. In step 310-5, the computer adjusts the bids in the unlinked auction, by inserting a bid for set $S_k$ in the smallest amount $P_k$ satisfying the constraints of the unlinked auction. The inserted bid of $P_k$ is placed on behalf of the provisional winner of set $S_k$ in the related auction. In step 310-6, it is determined whether all sets $S_k$ that are part of provisionally-winning bids in the related auction have been considered. If not, the process loops back to step 310-2. If all sets $S_k$ that are part of provisionally-winning bids in the related auction have been considered, then the process returns to step 312 in FIG. 7.

One exemplary constraint of the unlinked auction is a simple greater-than-or-equal-to inequality: for each bid in the related auction of communications licenses, there is required to be a corresponding bid at least as large in the unlinked auction for clearing rights. At step 310-4, for the set $S_k$ currently selected, it is determined whether the provisional winner of set $S_k$ in the related auction has placed a corresponding bid at least as large in the unlinked auction. If not, then at step 310-5, the computer would insert a bid in the unlinked auction for set $S_k$ in an amount equal to the provisionally-winning bid for set $S_k$ in the related auction. The inserted bid is placed on behalf of the provisional winner of set $S_k$ in the related auction.

Aggregation and Partition into "Clearing Rights"

In several of the preferred embodiments of the inventive system and method, contracts with incumbent broadcasters to clear the spectrum are transformed into "clearing rights" that are more nearly coextensive with the associated communications licenses. The clearing rights are constructed so as to align, in location on the electromagnetic spectrum and in geographic location, with the scope of a communications license or set of licenses. This facilitates the operating of the system and method already described and thereby facilitates the efficient clearing of encumbered spectrum.

In typical applications of the inventive system, the geographic region covered by a new communications license and the geographic region covered by an incumbent broadcaster are disparately different. For example, in the 700 MHz band of spectrum, each new license covers approximately one-sixth of the United States, whereas some 100 television stations nationally operate in this band. Therefore, to make the boundaries of a new license and the associated clearing rights line up, it is necessary to aggregate together the clearing agreements for a large number of television stations. At the same time, some television stations yield interference issues with more than one license region. For example, in the 700 MHz band of spectrum, Philadelphia is located very near the boundary between the Mid-Atlantic license and the Northeast license. If a television station with a strong signal is located in Philadelphia, the station yields interference issues with both the Mid-Atlantic and Northeast licenses. Therefore, to make the boundaries of a new license and the associated clearing rights line up, it is also sometimes necessary to partition a clearing agreement with a single television station into two pieces.

Several of the preferred embodiments of the inventive system and method include the aggregating and partitioning of contracts to clear into "clearing rights." This aggregating and partitioning is best implemented on a computer using mapping software such as MapInfo and using databases that include the broadcast contours of television stations, the boundaries of the communications licenses, and the locations of the population.

Figure 9:
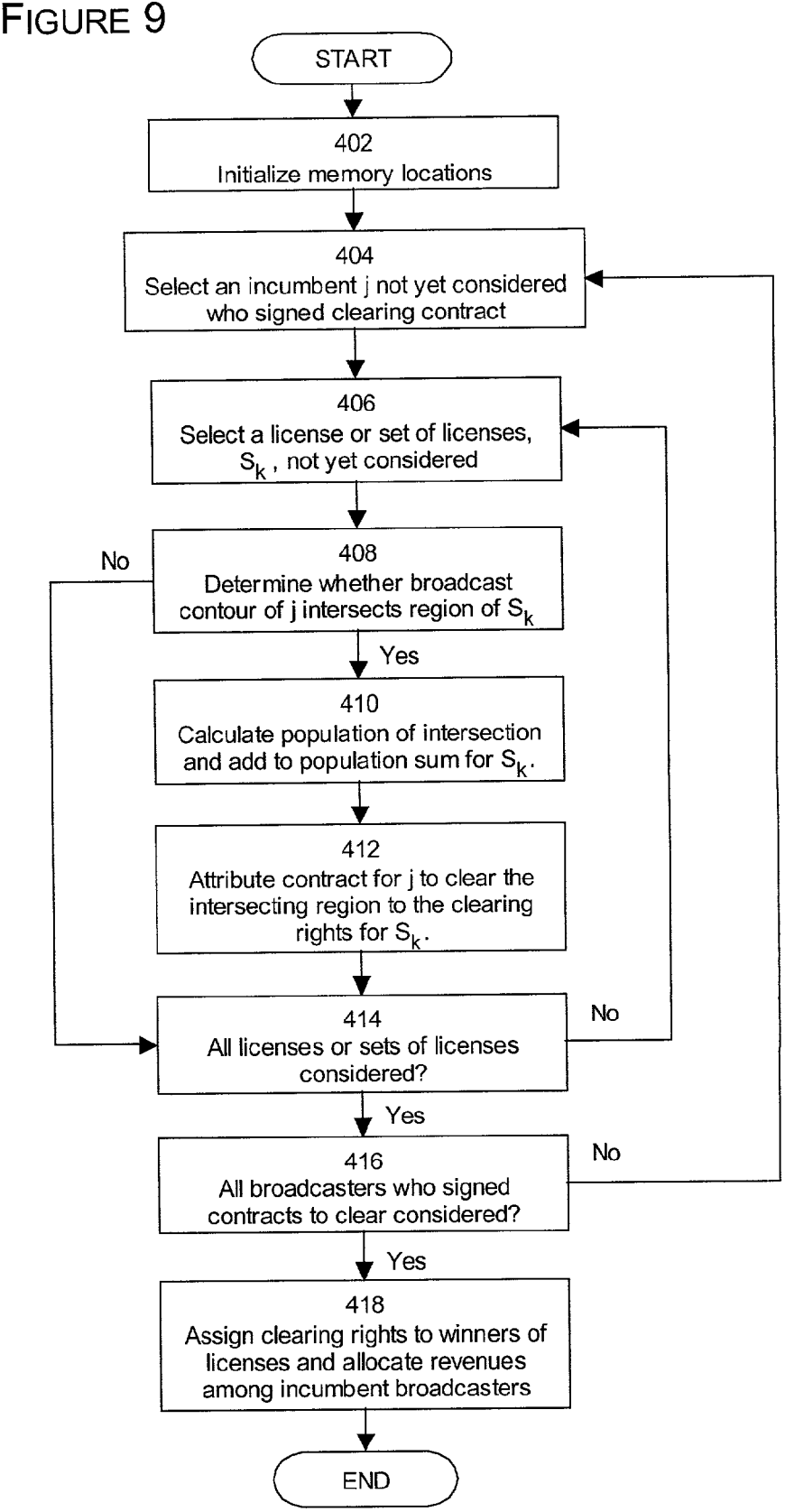
FIG. 9 is a flow diagram of an auction process in accordance with another embodiment of the invention.

FIG. 9 is a flow diagram of an embodiment of the invention in which contracts to clear various incumbent broadcasters are aggregated and/or partitioned to form clearing rights. The process starts with step 402, in which memory locations at the computer are initialized. In step 404, an incumbent broadcaster j who has not yet been considered, but who has signed a contract to clear, is selected, and the database is accessed for the broadcast contour of incumbent broadcaster j. The process continues with step 406, in which a license or set of licenses, $S_k$, that has not yet been considered is selected, and the database is accessed for the region covered by $S_k$. In step 408, it is determined whether the broadcast contour of j intersects with the region covered by $S_k$. If they do not intersect, the process skips to step 414. If they do intersect, then the process goes to step 410. There, the population in the intersecting region is calculated using the database and the computed population is added to a population sum for $S_k$, and these results are stored in the computer's memory. It then goes to step 412, where the contract for incumbent broadcasters to clear the intersecting region is attributed to the clearing rights for $S_k$. The process continues with step 414, where it is determined whether all licenses or sets of licenses have been considered. If not, the process loops back to step 406. If all licenses or sets of licenses have been considered, the process goes to step 416, where it is determined whether all incumbent broadcasters who have signed contracts to clear have been considered. If not, the process loops back to step 404. If all incumbent broadcasters who have signed contracts to clear have been considered, then the process goes to step 418, where the clearing rights are assigned to winners of licenses and the revenues from the clearing rights are allocated among incumbent broadcasters. This step is shown in more detail in FIG. 10. After step 418, the process ends.

Figure 10:
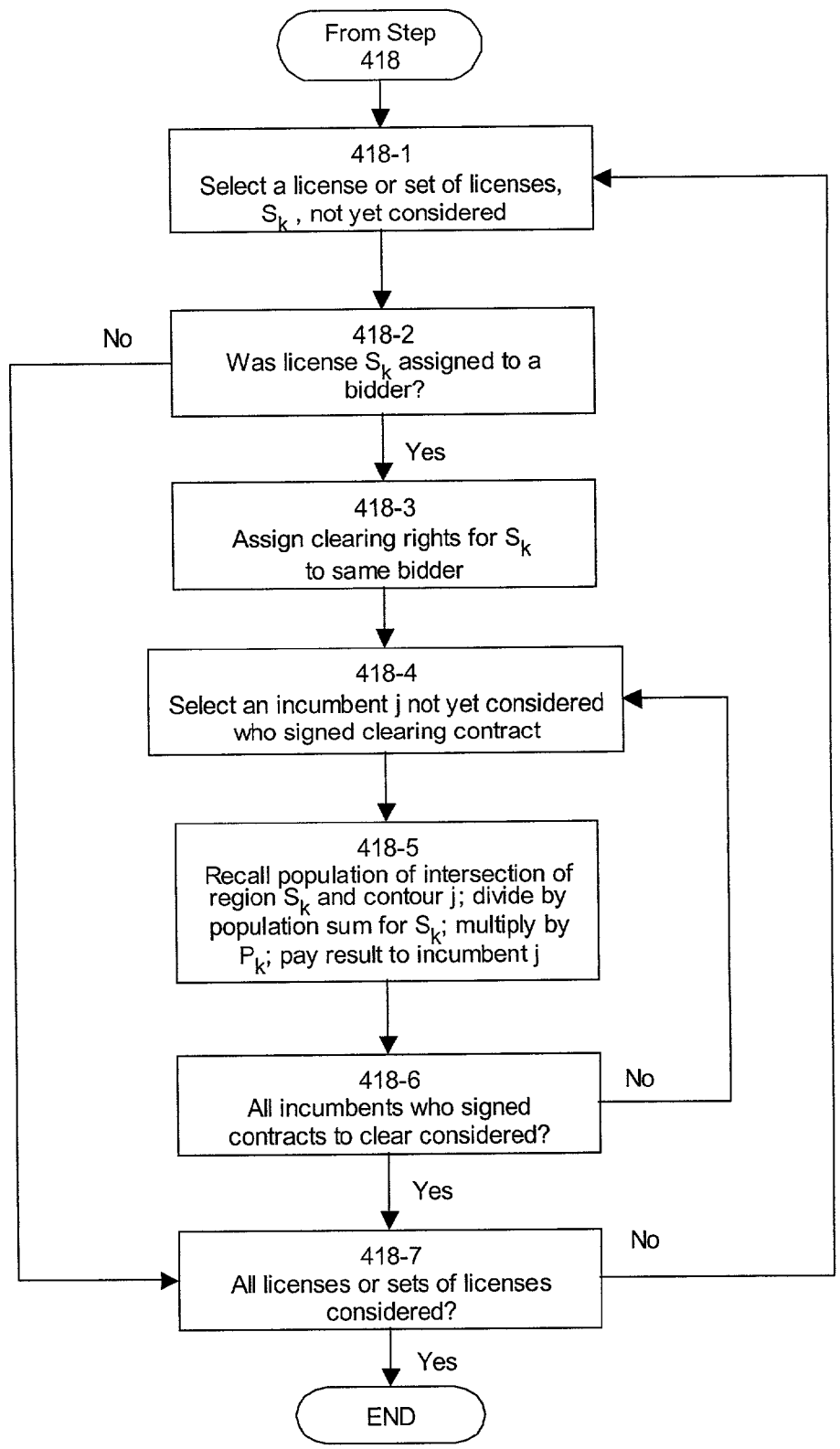
FIG. 10 is a flow diagram illustrating, in greater detail, an element of the diagram of FIG. 9.

FIG. 10 is a flow diagram of the process of step 418. It begins with step 418-1, in which a license or set of licenses, $S_k$, that has not yet been considered is selected. In step 418-2, it is determined whether the license or set of licenses $S_k$ was assigned to a bidder, and if so, which bidder. If it was not assigned to a bidder, the process skips to step 418-7. If it was assigned to a bidder, then the process goes to step 418-3, where the clearing rights for $S_k$ are assigned to the same bidder. In step 418-4, an incumbent broadcaster j who has not yet been considered, but who has signed a contract to clear, is selected. In step 418-5, the earlier results for $S_k$ and incumbent broadcaster j are recalled from the computer's memory. The population of the intersection of region $S_k$ and the contour of incumbent broadcaster j is divided by the population sum for $S_k$; this gives the share of $S_k$ for incumbent broadcaster j. This share is then multiplied by $P_k$, the price obtained for $S_k$, and the result is credited to incumbent broadcaster j. The process continues with step 418-6, where it is determined whether all incumbent broadcasters who have signed contracts to clear have been considered. If not, the process loops back to step 418-4. If all incumbent broadcasters who have signed contracts to clear have been considered, the process goes to step 418-7, where it is determined whether all licenses or sets of licenses have been considered. If not, the process loops back to step 418-1. If all licenses or sets of licenses have been considered, then the process ends.

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. A method implemented in a system comprising a plurality of computers, at least one of which is located remotely from at least one other of said computers and interconnected by a communication system, for conducting a first auction of a first set of items, said first auction conducted in association with a second auction of a second set of items, said first set of items being different from said second set of items, at least two bidders participating in the first auction, the method comprising:

a) initiating the first auction by identifying the first set of items, b) receiving bids for items in the first set of items using a first computer of said system and communicating at least some of said bids to a second computer of said system which is remote from said first computer via the communication system, c) constraining the received bids by accepting only bids which satisfy a constraint based on bids in the second auction, d) determining, using the second computer, whether the first auction should terminate, e) repeating b), c) and d) until the first auction is terminated, and f) assigning the first set of items to bidders based on the bids in force at the time the first auction was terminated.

2. The method of claim 1 wherein the first auction occurs at the same time as the second auction.

3. The method of claim 1 wherein the first auction occurs after the second auction.

4. The method of claim 1 wherein items in the second set are communication licenses and items in the first set are clearing rights related to the communication licenses.

5. The method of claim 1 wherein items in the first set are communication licenses and items in the second set are clearing rights related to the communication licenses.

6. The method of claim 1 wherein items in the second set are related to airport landing rights.

7. The method of claim 1 wherein items in the first set are related to airport landing rights.

8. The method of claim 1 wherein each item in the first set is related to an item in the second set.

9. The method of claim 8 which includes assigning each item in the first set to a successful bidder for the related item in the second set.

10. The method of claim 1 wherein each item in the first set is complementary to an item in the second set.

11. The method of claim 1 wherein step d) terminates the first auction in the event that no new bids were submitted and wherein step d) also provides new bidding information to bidders in the event that the first auction is not terminated.

12. The method of claim 1 wherein step f) is limited to selected bidders.

13. A method implemented in a system comprising a plurality of computers, at least one of which is located remotely from at least one other of said computers and interconnected by a communication system, for conducting a first auction of a first set of items, said first auction conducted in association with a second auction of a second set of items, said first set of items being different from said second set of items, at least one item in the first set having a complementary item in the second set, at least two bidders participating in the first auction, the method comprising:

a) initiating the first auction by identifying the first set of items, b) accepting bids for items in the first set of items using a first computer of said system and communicating at least some of said bids to a second computer of said system which is remote from said first computer via the communication system, at least one of the bids from one of the bidders conditional on said bidder winning a complementary item in the second auction, c) determining, using the second computer, whether the first auction should terminate, d) repeating b) and c) until the first auction is terminated, and e) eliminating each of the conditional bids which fail to satisfy any of their conditions, and thereafter assigning the first set of items to bidders based on the bids in force subsequent to the eliminating of the conditional bids which fail to satisfy any of their conditions.

14. The method of claim 13 wherein the first auction occurs at the same time as the second auction.

15. The method of claim 13 wherein the first auction occurs after the second auction.

16. The method of claim 13 wherein items in the second set are communication licenses and items in the first set are clearing rights related to the communication licenses.

17. The method of claim 13 wherein items in the first set are communication licenses and items in the second set are clearing rights related to the communication licenses.

18. The method of claim 13 wherein items in the second set are related to airport landing rights.

19. The method of claim 13 wherein items in the first set are related to airport landing rights.

20. The method of claim 13 wherein each item in the first set is related to an item in the second set.

21. The method of claim 20 which includes assigning each item in the first set to the successful bidder for the related item in the second set.

22. The method of claim 13 wherein each item in the first set is complementary to an item in the second set.

23. The method of claim 13 wherein step c) terminates the first auction in the event that no new bids were submitted and wherein step c) also provides new bidding information to bidders in the event that the first auction is not terminated.

24. The method of claim 13 wherein step e) is limited to selected bidders.

25. A system for conducting a first auction of a first set of items, said auction conducted in association with a second auction of a second set of items, said first set of items being different from said second set of items, said system allowing at least two bidders to participate in the first auction, the system comprising:

a) means for initiating the first auction by identifying the first set of items, b) means for inputting bids from bidders for items in the first set of items, c) means for constraining the inputted bids by accepting only bids which satisfy a constraint, based on bids for the second set of items in the second auction, d) means for determining whether the first auction should terminate, e) means for repeating the inputting, constraining and determining until the first auction is terminated, and f) means for assigning the first set of items to bidders based on the bids in force at the time the first auction was terminated.

26. The system of claim 25 wherein the first auction is a computer-implemented auction and occurs at the same time as the second auction.

27. The system of claim 25 wherein the first auction is a computer-implemented auction and occurs after the second auction.

28. The system of claim 25 wherein items in the second set are communication licenses and items in the first set are clearing rights related to the communication licenses.

29. The system of claim 25 wherein items in the first set are communication licenses and items in the second set are clearing rights related to the communication licenses.

30. The system of claim 25 wherein items in the second set are related to airport landing rights.

31. The system of claim 25 wherein items in the first set are related to airport landing rights.

32. The system of claim 25 wherein each item in the first set is related to an item in the second set.

33. The system of claim 32 which includes means for assigning each item in the first set to a successful bidder for the related item in the second set.

34. The system of claim 25 wherein each item in the first set is complementary to an item in the second set.

35. The system of claim 25 wherein the means for determining terminates the first auction in the event that no new bids were submitted and further includes means for providing new bidding information to bidders in the event that the first auction is not terminated.

36. The system of claim 25 wherein said means for assigning is limited to operating with selected bidders.

37. A system for conducting a first auction of a first set of items, said auction conducted in association with a second auction of a second set of items, said first set of items being different from said second set of items, at least one item in the first set having a complementary item in the second set, said system allowing at least two bidders to participate in the first auction, the system comprising:
 a) means for initiating the first auction by identifying the first set of items,
 b) means for inputting bids from bidders for items in the first set of items, at least one of the bids from one of the bidders conditional on said bidder winning a complementary item in the second auction,
 c) means for determining whether the first auction should terminate,
 d) means for repeating the inputting and determining until the first auction is terminated, and
 e) means for eliminating each of the conditional bids which fail to satisfy any of their conditions, and thereafter assigning the first set of items to bidders based on the bids in force subsequent to the eliminating of the conditional bids which fail to satisfy any of their conditions.

38. The system of claim 37 wherein the first auction is a computer-implemented auction and occurs at the same time as the related second auction.

39. The system of claim 37 wherein the first auction is a computer-implemented auction and occurs after the second auction.

40. The system of claim 37 wherein items in the second set are communication licenses and items in the first set are clearing rights related to the communication licenses.

41. The system of claim 37 wherein items in the first set are communication licenses and items in the second set are clearing rights related to the communication licenses.

42. The system of claim 37 wherein items in the second set are related to airport landing rights.

43. The system of claim 37 wherein items in the first set are related to airport landing rights.

44. The system of claim 37 wherein each item in the first set is related to an item in the second set.

45. The system of claim 44 which includes means for assigning each item in the first set to a successful bidder for the related item in the second set.

46. The system of claim 37 wherein each item in the first set is complementary to an item in the second set.

47. The system of claim 37 wherein said means for determining terminates the first auction in the event that no new bids were submitted and said means for determining further includes means for providing new bidding information to bidders in the event that the first auction is not terminated.

48. The system of claim 37 wherein said means for assigning is limited to operation with selected bidders.

49. A method implemented in a system comprising a plurality of computers, at least one of which is located remotely from at least one other of said computers and interconnected by a communication system, for conducting a first auction of a first set of items and a second auction of a second set of items, said first set of items being different from said second set of items, at least two bidders participating in each of the auctions, the method comprising:
 a) initiating the first auction by identifying the first set of items,
 b) initiating the second auction by identifying the second set of items and accepting bids therefor,
 c) receiving bids for items in the first set of items in the first auction using a first computer of said system and communicating at least some of said bids to a second computer of said system which is remote from the first computer via the communication system,
 d) constraining the received bids in the first auction by accepting only bids which satisfy a constraint based on bids for the second set of items in the second auction,
 e) determining, using the second computer, whether the first auction should terminate,
 f) repeating c), d) and e) until the first auction is terminated, and
 g) assigning the first set of items to bidders based on the bids in force at the time the first auction was terminated.

50. A system for conducting a first auction of a first set of items and a second auction of a second set of items, said first set of items being different from said second set of items, said system allowing at least two bidders to participate in each of the auctions, the system comprising:
 a) means for initiating the first auction by identifying the first set of items,
 b) means for initiating the second auction by identifying the second set of items and accepting bids therefor,
 c) means for inputting bids from bidders for items in the first set of items in the first auction,
 d) means for constraining the inputted bids in the first auction by accepting only bids which satisfy a constraint based on bids for the second set of items in the second auction,
 e) means for determining whether the first auction should terminate,
 f) means for repeating c), d) and e) until the first auction is terminated, and
 g) means for assigning the first set of items to bidders based on the bids in force at the time the first auction was terminated.

51. A method implemented in a system comprising a plurality of computers, at least one of which is located remotely from at least one other of said computers and interconnected by a communication system, for conducting a first auction of a first set of items and a second auction of a second set of items, said first set of items being different from said second set of items, at least one item in the first set having a complementary item in the second set, at least two bidders participating in the auctions, the method comprising:
 a) initiating the first auction by identifying the first set of items,
 b) initiating the second auction by identifying the second set of items and accepting bids therefor,
 c) receiving bids for items in the first set of items using a first computer of said system and communicating at least some of said bids to a second computer of said system which is remote from the first computer via the communication system, at least one of the bids from one of the bidders conditional on said bidder winning a complementary item in the second auction,
 d) determining, using the second computer, whether the first auction should terminate,
 e) repeating c) and d) until the first auction is terminated, and
 f)) eliminating each of the conditional bids which fail to satisfy any of their conditions, and thereafter assigning the first set of items to bidders based on the bids in force at the time the first auction was terminated.

52. A system for conducting a first auction of a first set of items and a second auction of a second set of items, said first set of items being different from said second set of items, at least one item in the first set having a complementary item in the second set, said system allowing at least two bidders to participate in the auctions, the system comprising:
- a) means for initiating the first auction by identifying the first set of items,
- b) means for initiating the second auction by identifying the second set of items and accepting bids therefor,
- c) means for accepting bids from bidders for items in the first set of items, at least one of the bids from one of the bidders conditional on said bidder winning a complementary item in the second auction,
- d) means for determining whether the first auction should terminate,
- e) means for repeating c) and d) until the first auction is terminated, and
- f) means for eliminating each of the conditional bids which fail to satisfy any of their conditions, and thereafter assigning the first set of items to bidders based on the bids in force at the time the first auction was terminated.

53. A computer system for conducting a first auction of a first set of items and a second auction of a second set of items, said computer system comprising a plurality of computers, at least one of which is located remotely from at least one other of said computers and interconnected by a communication system, said first set of items being different from said second set of items, said system allowing at least two bidders to participate in each of the auctions, the computer system:
- a) initiating the first auction by identifying the first set of items,
- b) initiating the second auction by identifying the second set of items and accepting bids therefor,
- c) receiving bids for items in the first set of items in the first auction using a first computer of said system and communicating at least some of said bids to a second computer of said system which is remote from the first computer via the communication system,
- d) constraining the received bids in the first auction by accepting only bids which satisfy a constraint based on bids for the second set of items in the second auction,
- e) determining in the second computer whether the first auction should terminate,
- f) repeating c), d) and e) until the first auction is terminated, and
- g) assigning the first set of items to bidders based on the bids in force at the time the first auction was terminated.

54. A computer system for conducting a first auction of a first set of items and a second auction of a second set of items, said computer system comprising a plurality of computers, at least one of which is located remotely from at least one other of said computers and interconnected by a communication system, said first set of items being different from said second set of items, at least one item in the first set having a complementary item in the second set, said system allowing at least two bidders to participate in the auctions, the computer system:
- a) initiating the first auction by identifying the first set of items,
- b) initiating the second auction by identifying the second set of items and accepting bids therefor,
- c) accepting bids for items in the first set of items using a first computer of said system and communicating at least some of said bids to a second computer of said system which is remote from the first computer via the communication system, at least one of the bids from one of the bidders conditional on said bidder winning a complementary item in the second auction,
- d) determining in the second computer whether the first auction should terminate,
- e) repeating c) and d) until the first auction is terminated, and
- f) eliminating each of the conditional bids which fail to satisfy any of their conditions,
- and thereafter assigning the first set of items to bidders based on the bids in force at the time the first auction was terminated.

* * * * *